Jan. 12, 1965  R. W. MORRISON  3,165,680
DIGITAL POSITION CONTROL SERVOSYSTEM
Filed Sept. 6, 1960  5 Sheets-Sheet 1

INVENTOR
Robert W. Morrison
BY *[signature]*
ATTORNEY

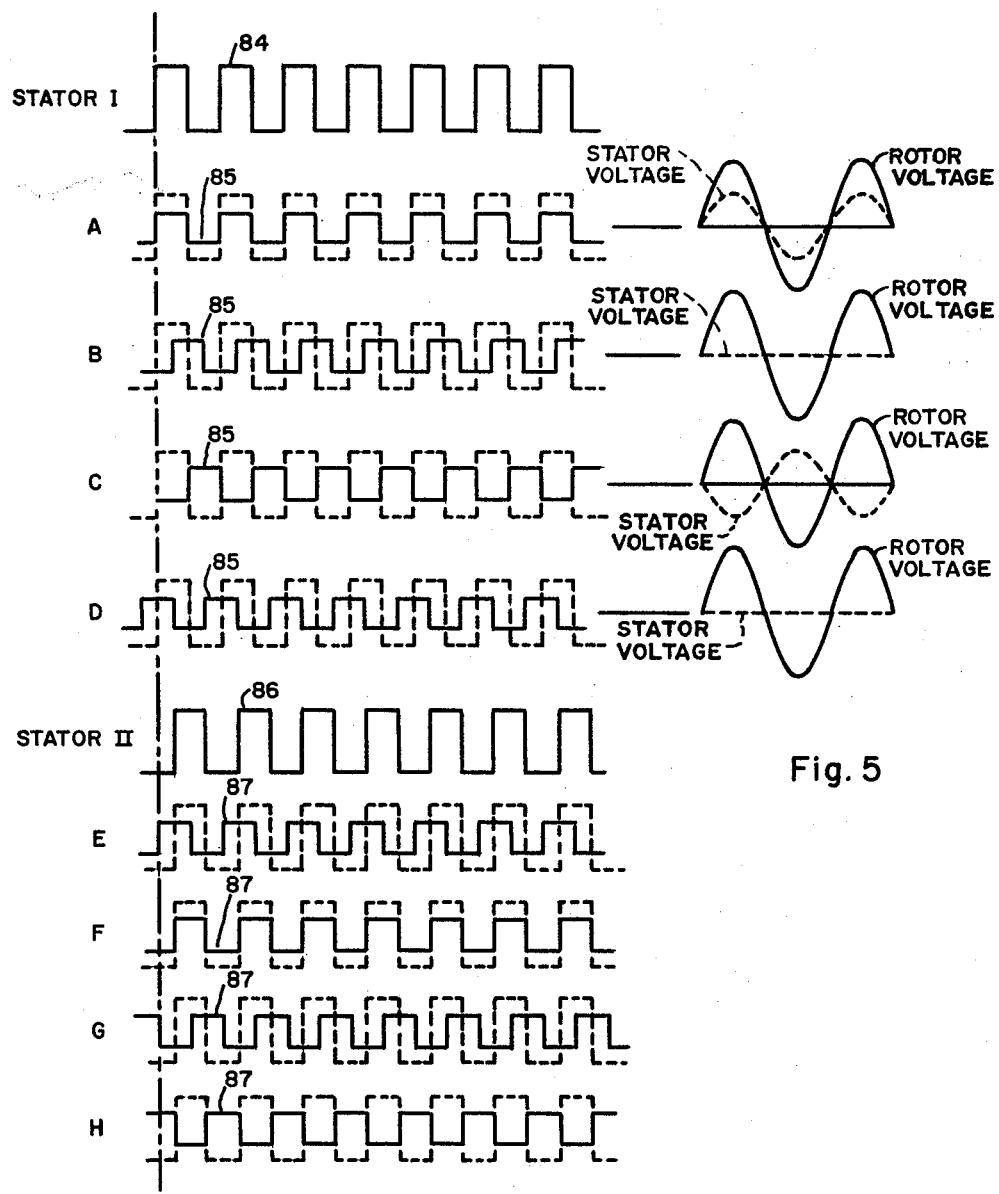

000# United States Patent Office 3,165,680
Patented Jan. 12, 1965

3,165,680
DIGITAL POSITION CONTROL SERVOSYSTEM
Robert W. Morrison, Clarence, N.Y., assignor to Westinghouse Electric Corporation, East Pittsburgh, Pa., a corporation of Pennsylvania
Filed Sept. 6, 1960, Ser. No. 54,109
6 Claims. (Cl. 318—28)

The present invention relates in general to position control apparatus for a machine member, and more particularly to a numerical position control apparatus for a machine tool member.

It is an object of the present invention to provide improved position controlling apparatus for a machine member, which apparatus is more simple and suitable for use with any number system.

It is a different object of the present invention to provide improved position controlling apparatus for a machine member, which apparatus requires fewer component parts and is more suitable and reliable in its operation.

It is an additional object of the present invention to provide improved position controlling apparatus for a machine member, which apparatus is operative in an improved manner with a more advantageous circuit arrangement to result in faster and more reliable positioning of the machine member from an actual position to a desired or reference position.

Further objects of the present invention will become apparent from the following description taken in conjunction with the accompanying drawings, wherein:

FIG. 4 is an illustrative showing of one form of the transducer device of FIG. 1;

FIG. 5 is a schematic showing of the transducer windings and a simplified curve chart illustrating the operation of the transducer device of FIG. 4;

Figure 1:
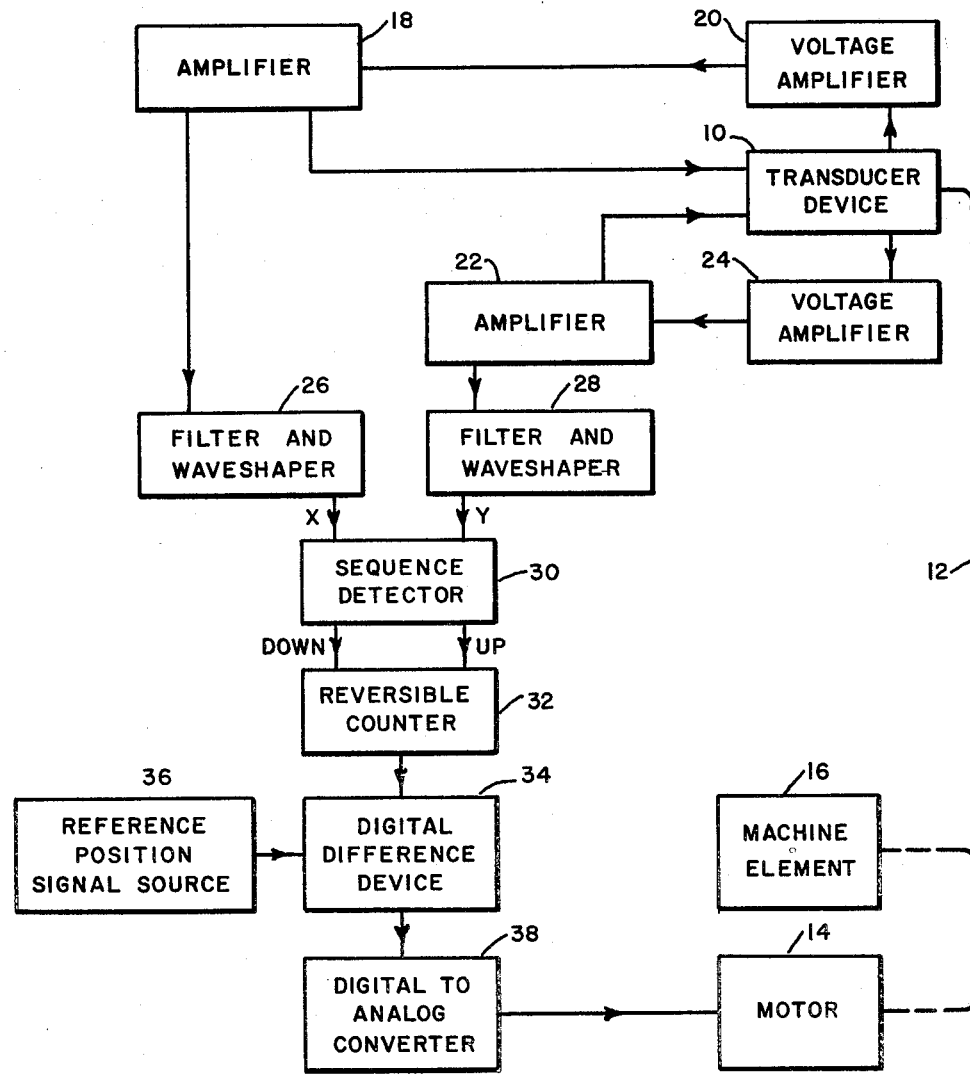
FIGURE 1 is a diagrammatic showing of the position control apparatus of the present invention.

In FIG. 1 there is shown a transducer device 10 which is mechanically connected through a connection 12 to a motor 14, which is operative to control the position of a machine element 16. As will be later described, the transducer device 10 includes a first coupling circuit having a first input primary winding and a first output secondary winding connected between respectively, an amplifier 18 and a voltage amplifier 20 as shown in FIG 1. The amplifier 18 is operative as a power amplifier in the circuit of FIG. 1. The transducer device 10 includes a second coupling circuit comprising a second input primary winding and a second output secondary winding connected between respectively, an amplifier 22 and a voltage amplifier 24. In this regard the first coupling circuit of the transducer device 10 is operative to connect the output signal from the amplifier 18 back to the input of the amplifier 18 through the voltage amplifier 20, such that a feedback circuit is thereby provided which depending upon the coupling provided by the transducer device is connected to provide regenerative and positive feedback or degenerative and negative feedback. Similarly the second coupling circuit of the transducer device 10 is connected between the output of the amplifier 22 through the voltage amplifier 24 to the input of the amplifier 22, such that either positive or negative feedback of the output signal of the amplifier 22 is supplied to the input of the amplifier 22 which feedback depends upon the coupling provided by the second coupling circuit of the transducer device 10.

A first control signal provided by the feedback operation of the amplifier 18 through the first coupling circuit of the transducer device 10 and the voltage amplifier 20 is supplied to a filter and wave shaper network 26. A second control signal from the circuit including the amplifier 22, the second coupling circuit of the transducer 10 and the voltage amplifier 24 is supplied to a filter and wave shaper network 28. A first control signal, from the filter and wave shaper network 26 is supplied to one input of a sequence detector 30, and a second control signal, from the filter and wave shaper network 28 is supplied to a second input of the sequence detector 30, such that and depending upon the phase relationship of the respective first and second control signals an output signal is supplied to one of a down input of a reversible counter 32 or an up input connection of the reversible counter 32. Thusly, a count is stored in the reversible counter 32 corresponding to the movement of the machine element 16 as sensed through the variation of the first and second coupling circuits of the transducer device 10.

The resulting output signal or net storage signal of reversible counter 32 is supplied to a first input of a digital difference device 34. A second input of the digital difference device 34 is supplied with a reference or desired position signal from a reference position signal source 36. The digital difference device 34 is operative to effect a differencing between these respective supplied signals, such that the difference signal is supplied to a digital to analog converter 38 which difference signal is in effect a position difference or error signal between the reference position signal from the reference position signal source 36 and the actual position of the machine element 16 as indicated through the operation of the transducer device 10 and the associated circuit apparatus operative with that transducer device 10. The latter error signal passes through the digital to analog converter 38 for energizing a motor 14 to correct the position of the machine element 16.

Figure 2:
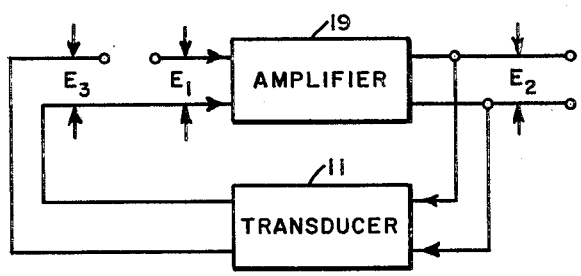
FIG. 2 is an illustrative showing of the signal feedback circuit.

In FIG. 2 there is shown an amplifier 19 having an output signal E2 which is connected in a feedback circuit arrangement through a transducer 11 to the input of the amplifier 19. An oscillator is generally defined as a non-rotating device designed to produce electrical alternations from a direct current source. In this regard, the amplifier 19 can be made to operate as a component of an oscillatory circuit by providing feedback of the output signal of the amplifier 19 to the input of the amplifier 19 in such a way that the original signal is strengthened; this is known as positive and regenerative feedback. As as general rule, an oscillator device which operates under very nearly linear conditions will provide an output signal which is essentially sinusoidal and as a further general statement, a sinusoidal oscillator will operate at that frequency for which the total phase shift around the complete loop is either zero or an integral multiple of the quantity $2\pi$. The operating frequency, of the above control loop, may be determined by a resonant circuit, or the like, such as, for example, a notched filter or any well known tank circuit. The transducer 11, shown in FIG. 2 is operative to have a dual phase characteristic of its output signal, which characteristic is usually referred to as differential transformer action. In other words, the output signal phase shifts 180° every time it passes through a null. Thusly, in effect the output signal shifts from an inphase condition relative to the applied input signal of the amplifier to an out-of-phase condition. When the coupling provided by the transducer 11 is in a first position to provide a zero phase shift, the output signal E2 of the amplifier 19 is supplied as a signal E3 in phase with the original input signal E1, and the amplifier 19 and transducer 11 in combination circuit will operate as an oscillator. On the other hand, as the coupling of the transducer 11 is changed, such that it provides a 180° phase shift to the signal supplied by the output of the amplifier 19 to the input of the amplifier 19, a degenerative or negative feedback condition is thereby provided and oscillations will not occur. As well known to persons skilled in this art, it should be understood that another criteria for maintaining oscillations, when the loop phase is zero, is that the total loop gain be equal to or greater than unity. That is, the gain of the amplifiers times the attenuation, if any, of the transducer should be equal to or greater than unity.

Figure 3:
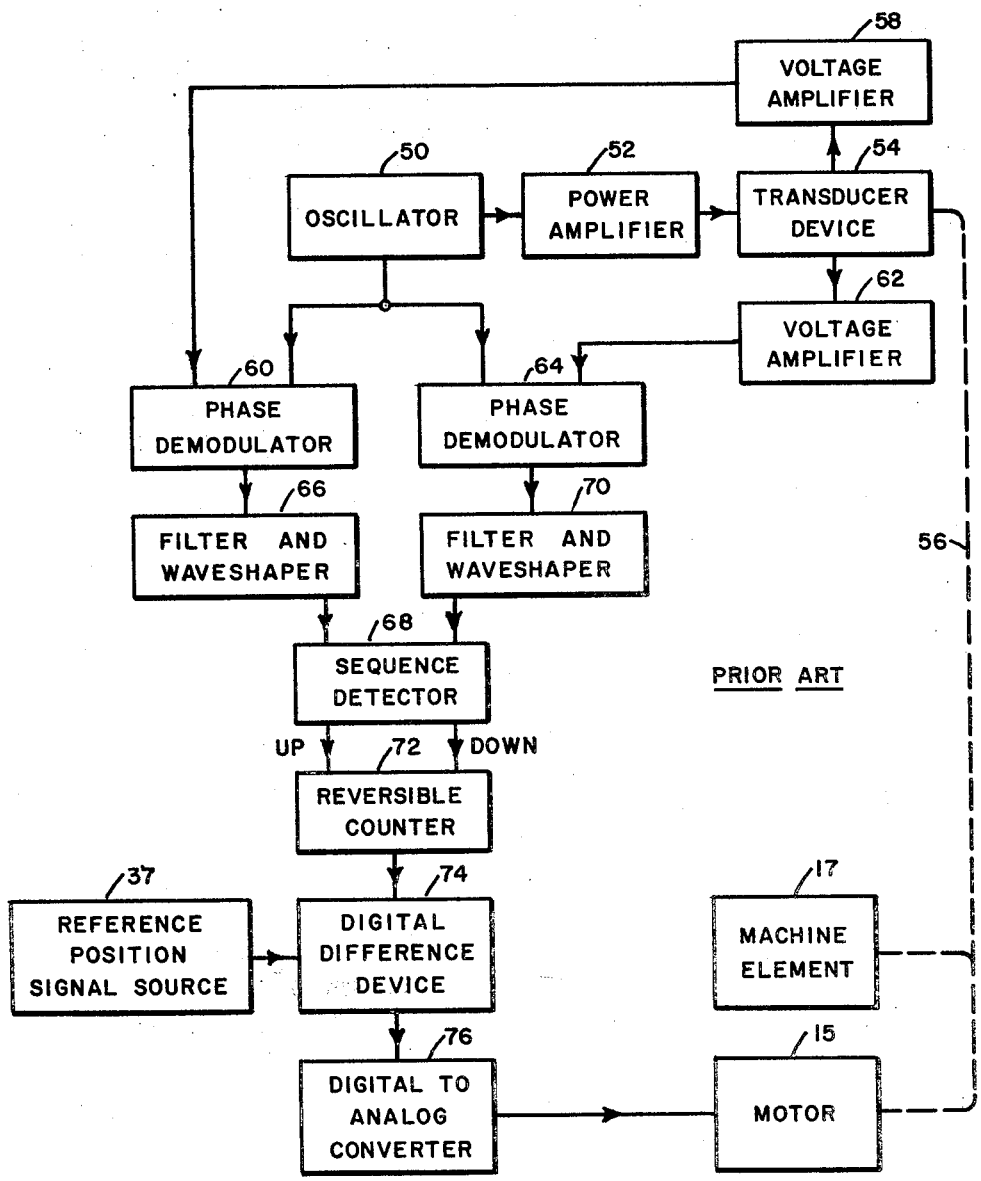
FIG. 3 is a diagrammatic showing of well known prior art position control apparatus.

In FIG. 3 there is shown a well known prior art position control apparatus wherein a separate oscillator 50 continuously supplies an output signal through a power amplifier 52 to the input of a transducer 54. The transducer 54 is mechanically coupled through a connection 56 to a machine element 17 and a motor 15 operative with the machine element. Thusly, as the position of the machine element 17 is changed, the coupling provided by the transducer 54 from its common input circuit to its respective output circuits is changed. In this regard a first output circuit which could be in the form of a stator or secondary winding supplies a first control signal through a voltage amplifier 58 to a phase sensitive demodulator 60, a second output circuit of the transducer 54 supplies a second output signal through a voltage amplifier 62 to a phase sensitive demodulator 64. The phase sensitive demodulators 60 and 64 are supplied suitable signals from the oscillator 50, such that the resulting phase changes of the signals from the oscillator 50 due to the operation of the transducer 54 are thereby detected and cause a first control signal to be supplied through the filter and wave shaper 66 to one input of a sequence detector 68, and cause a second output signal to be supplied through a filter and wave shaper 70 to a second input of the sequence detector 68. The sequence detector 68 is operative in a manner similar to the operation of the sequence detector 30, shown in FIG. 1, to energize one of an up-counting input or a down-counting input respectively of a reversible counter 72, which provides a net count output signal to a digital difference device 74 operative with a reference position signal source 37 for providing a position error signal in digital form to a digital to analog converter 76 and thereby provide an analog position error signal to control the operation of the motor 15.

In FIG. 4 there is provided an illustrative showing of one form of the transducer device 10 of FIG. 1. A first plate or disc member 80 is operative to carry the two input rotor windings for the transducer device 10 relative to a second plate or disc member 82 which is operative to support the two stator or secondary windings of the transducer device 10. The motor 14 is operative through suitable gears or the like to rotate the disc 80 relative to the stationary disc 82.

In FIG. 5 there is shown the operative positions of the stator winding 84 which corresponds to one of the secondary windings carried by the plate or disc 82 and a second stator winding 86 which is also carried by the stator disc 82. The rotor winding 85 operative with the stator winding 84 is schematically shown in position charts A, B, C and D as changing in its position from a first position (A) where the coupling is a maximum to give the output waveform, indicated to the right of the position chart A. A second position chart B is indicated schematically, wherein the rotor winding 85 has been moved 90° relative to the stator winding to give the output signal waveform as shown to the right of the position chart B. A third position chart C is shown, wherein the rotor winding 85 has been moved 180° relative to the stator winding to give the output signal waveform as shown to the right of position chart C. In position chart D the rotor winding 85 has moved 270° relative to the stator winding to provide the output signal as shown to the right of position chart D. In this regard the output signals are shown in a dashed line relative to the applied input signals.

With further reference to the showing of FIG. 5, it should be noted that the rotor winding 85 operative with the stator winding 84 is substantially similar in position relative to the rotor winding 87 operative with the stator winding 86. In this regard the position charts E, F, G and H shown relaive to the stator winding 86 correspond respectively to the position charts A, B, C and D shown relative to the stator winding 84.

Figure 6:
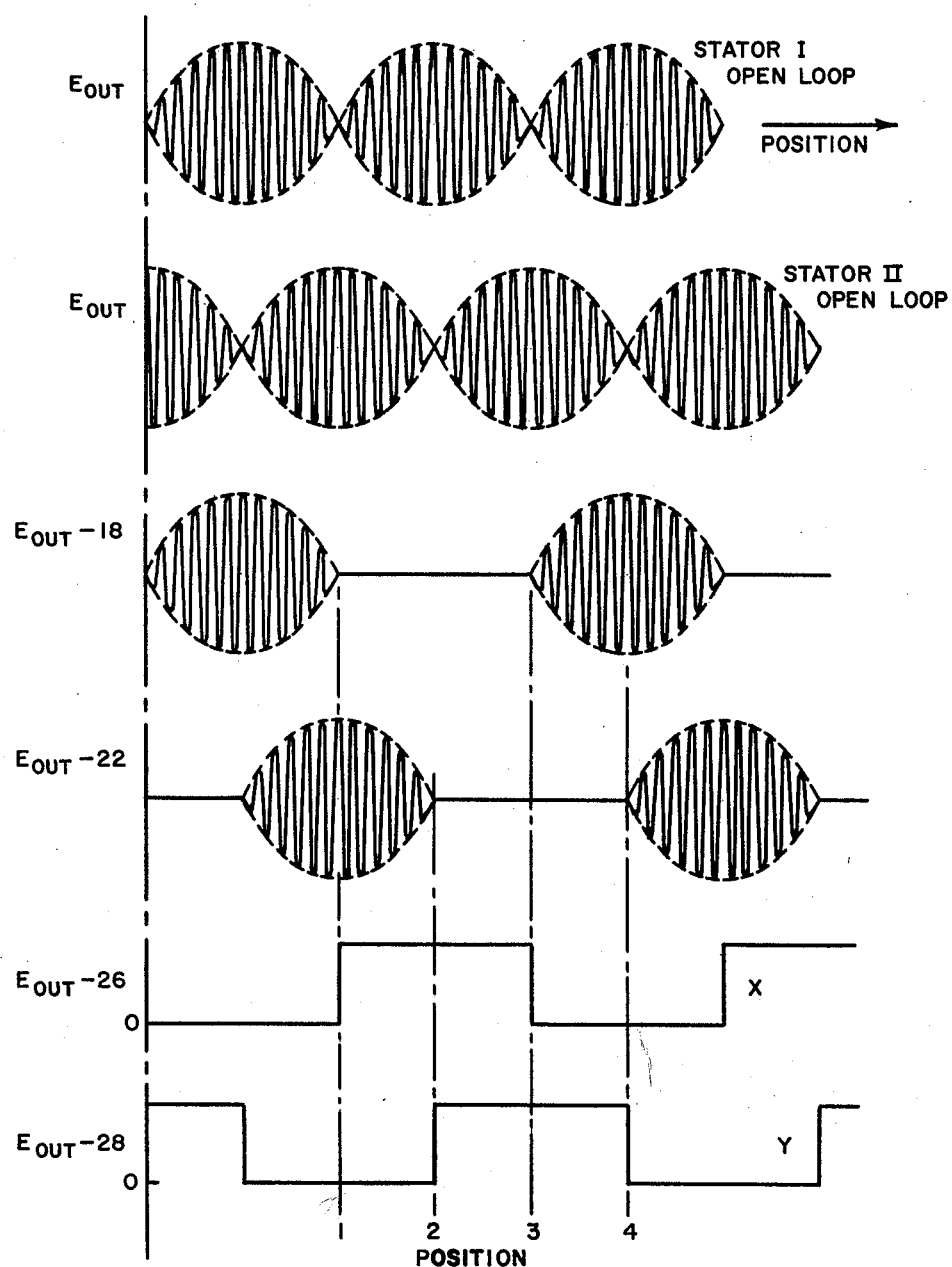
FIG. 6 is a curve chart illustrating the operation of the present control apparatus.

In FIG. 6 the uppermost two curve charts illustrate the output signals obtainable if the respective transducer windings were not connected in closed loop circuits as shown in FIG. 1. The middle two curve charts show the signal actually obtained from the respective amplifiers 18 and 22 as supplied to the filter and wave shaper networks. The bottom two curve charts show the output signals provided by the respective filter and wave shaper networks 26 and 28.

Figure 7:
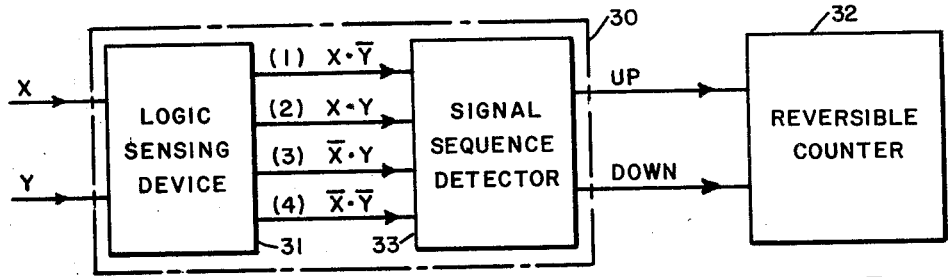
FIG. 7 is an illustrative showing of the logic operation of the sequence detector of FIG. 1.

In FIG. 7, there is provided an illustrative showing of the logic operation of the sequence detector of FIG. 1. There is supplied from the filter and wave shaper 26 of FIG. 1 to a first input of the sequence detector 30 the waveform indicated as X in FIG. 1 as well as in FIG. 6, and there is supplied from the filter and wave shaper 28 to a second input of the sequence detector 30 of FIG. 1 the waveform indicated as Y in FIG. 1 as well as in FIG. 6. There is provided within the sequence detector 30 a logic sensing device 31 operative to provide four output signals in accordance with the Boolean algebra formulas indicated for those respective outputs. More specifically, a first ouput voltage supplied to the signal sequence detector 33 for the position 1, indicated in FIG. 6 relative to the bottom two curve charts showing these waveforms X and Y, wherein the X signal is present and not the Y signal. In the position 2, the X signal and the Y signal are present. In position 3 not the X signal and the Y signal are present, and in position 4 not the X signal and not the Y signal are present. The signal sequence detector 33 is operative with these input indications to energize one of the up-output or the down-output connection to the reversible counter 32. In this regard, the operation of the logic sensing device 31 and the signal sequence detector 33 is believed to be well known to persons skilled in this art. Devices of this type are readily available in the open market at present.

Figure 8:
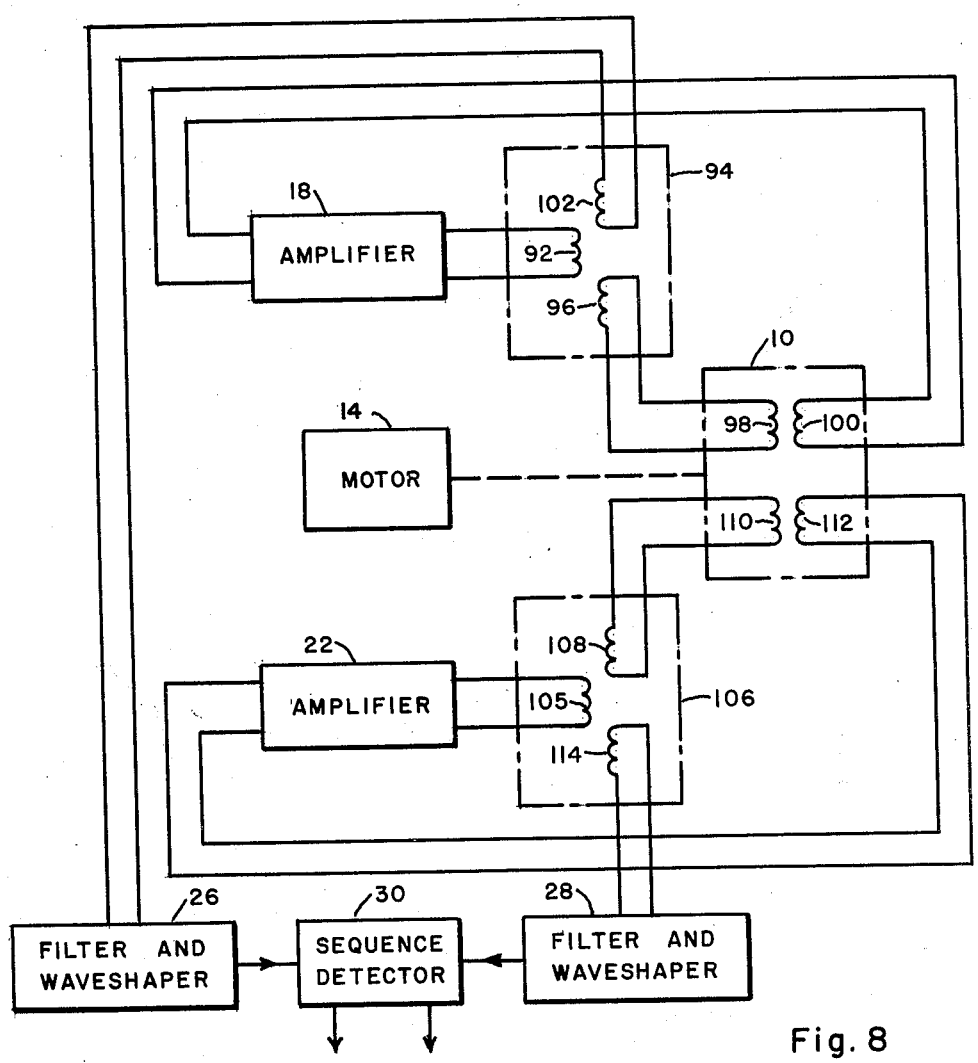
FIG. 8 is a schematic showing of a portion of the apparatus of FIG. 1.

In FIG. 8 there is provided a schematic showing of a portion of the position control apparatus of FIG. 1 including the amplifiers 18 and 22 operative with the transducer device 10 and showing the intermediate coupling transformers 94 and 106. More specifically, the amplifier 18 has its output coupled through a primary winding 92 of the transformer 94, including a first secondary winding 96 connected to one primary rotor winding 98 of the transducer device 10. The primary winding 98 is coupled to a secondary stator winding 100 which in turn is connected to the input of the amplifier 18. The coupling transformer 94 includes a second secondary winding 102 connected through the filter and wave shaper 26 to one input of the sequence detector 30. Similarly the amplifier 22 is connected to a primary winding 105 of a coupling transformer 106 including a first secondary winding 108 connected to a primary rotor winding 110 of the transducer device 10. The latter primary winding 110 is coupled to a secondary stator winding 112 which is connected to the input of the amplifier 22. The coupling transformer 106 includes a second secondary winding 114 connected through the filter and wave shaper 28 to the second input of the sequence detector 30.

It should be noted that the motor 14 is operative to rotate the primary rotor windings 98 and 110 in accordance with the operation of the motor 14, as well as to rotate the secondary windings 96 and 108 of the coupling transformers 94 and 106. The manufacture of the latter coupling transformers 94 and 106 is such that, as the secondary windings 96 and 108 are rotated or moved relative to the primary windings for these respective transformers, there is no phase variation in the transmitted signals. Whereas in the operation of the transducer device 10 the effective coupling between the respective primary rotor and secondary stator windings is varied such that there is a phase modulation of the resulting feedback coupled signals to in effect cause the respective amplifier devices to become oscillatory in their operation or not oscillatory in their operation. It should also be noted that the windings 92 and 102 of the coupling transformer 94 are fixed in position, as are the windings 105 and 114 of the coupling transformer 106.

In the operation of the position control apparatus, as shown in the drawings, the transducer device 10, by following the operation of the motor 14 and thereby the movement or position of the machine element 16, effectively couples the output signals of the respective amplifiers 18 and 22 through the provided feedback paths, as shown in FIG. 8, to the inputs of the respective amplifiers for providing either positive or negative feedback depending upon the coupling positions of the respective windings of the transducer device 10. In this manner the presence or absence of the respective output signals as supplied to the filter and wave shaper 26 on the one hand and the filter and wave shaper 28 on the other hand is determined.

More specifically, and with reference to FIG. 6 of the drawings, in the position 1 the transducer device is operative to provide the signal X from the filter and wave shaper 26 in that the primary winding 98 shown in FIG. 8 is so positioned relative to the secondary winding 100 that a zero phase shift occurs and thereby a positive feedback coupling is provided through the transducer device. This causes the amplifier 18 and its associated circuit to operate as an oscillator relative to the inherent signal level provided by the amplifier 18, when it is energized by a power supply. The noise signal values and other inherent signal values of the amplifier 18 are operative to make this circuit self-oscillatory. On the other hand, the coupling between the primary winding 110 and the secondary winding 112 of the transducer device 10 as shown in FIG. 8, is such for the position 1 as shown in FIG. 6, that the Y signal as supplied by the filter and wave shaper 28 does not have a value or has a zero value. As the motor 14 continues to operate it varies the position of the transducer device 10 such that, in the position 2 as shown in FIG. 6 the X signal from the circuit of the amplifier 18 has a value and the Y signal supplied by the filter and wave shaper 28 and the circuit of the amplifier 22 has a value. As the motor continues its operation, the transducer device 10 varies the coupling between its respective primary and secondary circuits such that, in the position 3 as shown in FIG. 6 the X signal has no value whereas the Y signal does have a value. In the position 4 as shown in FIG. 6, both the X signal and the Y signal have no value or a zero value. In this way the values of the respective signals X and Y vary as shown in FIG. 6, to provide a suitable indication to the signal sequence detector 33, shown in FIG. 7 of the movement direction as well as the movement amount of the machine element 16 due to the operation of the motor 14.

Suitable filter and wave shaper circuits are known to those skilled in the present art for providing the substantially clean square waveform signals X and Y as shown in FIG. 6, from the sinusoidal waveforms supplied by the circuits of the respective amplifiers 18 and 22. In this regard, it should be noted that the filter and wave shaper devices 26 and 28 include a suitable low pass filter circuit for removing any high frequency carrier provided by the oscillating effect of the respective amplifier circuits, and a rectifier or detector device to half-wave rectify the resulting signals. The wave shaper portion of the circuits is so operative with the thereby obtained sinusoidal shaped waveforms as to provide the square waveforms. This also can be accomplished, for example, by well known and conventional bistable circuit devices presently available in the open market.

The present application is related to a copending patent application by the same inventor entitled "Wave Shaper Circuit" filed September 6, 1960, Serial No. 54,071, and assigned to the same assignee, which shows one specific form of wave shaper apparatus that has been found to be suitable in this regard.

Although the present invention has been described with a certain degree of particularity it should be understood that the present disclosure has been made only by way of example and that numerous changes in the details of construction and the combination and arrangement of parts may be resorted to without departing from the scope and spirit of the present invention.

I claim as my invention:

1. In position control apparatus for a movable machine device, the combination of first oscillatory signal amplifying means, second oscillatory signal amplifying means, a transducer device operable to respond to the movement of said machine device, said transducer device having a first variable coupling circuit connected around said first signal amplifying means for providing a first control signal from said first signal amplifying means in accordance with the coupling variation of said first circuit due to movement of said machine device, said transducer device having a second variable coupling circuit connected around said second signal amplifying means for providing a second control signal from said second signal amplifying means in accordance with the coupling variation of said second circuit due to movement of said machine device, signal comparison means operative with each of said first and second control signals for providing a position controlling signal in accordance with a predetermined comparison of said first and second control signals, and motor means connected to said signal comparison means and operable with said machine device for controlling the movement of said machine device in response to said position controlling signal.

2. In position control apparatus for a movable machine device, the combination of first oscillatory signal amplifying means, second oscillatory signal amplifying means, a transducer device operable to respond to the movement of said machine device, said transducer device including first variable feedback coupling means connected around said first signal amplifying means for providing a first control signal from said first signal amplifying means in accordance with the variation of the feedback coupling in response to the movement of said machine device, said transducer device including second variable feedback coupling means connected around said second signal amplifying means for providing a second control signal from said second signal amplifying means in accordance with the variation of the feedback coupling in response to the movement of said machine device, signal comparison means operative with each of said first and second control signals for providing an output control signal in accordance with a predetermined comparison of said first and second control signals, and motor means connected to said signal comparison means and operable with said machine device for controlling the movement of said machine device in response to said output control signal.

3. In position control apparatus for a machine device and operative with a desired position signal, the combination of first signal amplifying means, second signal amplifying means, a transducer device operable to respond to the position of said machine device, said transducer device having a first variable coupling circuit connected around said first signal amplifying means for providing an oscillatory first control signal in accordance with the first circuit coupling variation in response to the position of said machine device, said transducer device having a second variable coupling circuit connected around said second signal amplifying means for providing an oscillatory second control signal in accordance with the second circuit coupling variation in response to the position of said machine device, signal comparison means operative with each of said first and second control signals for providing an actual position signal in accordance with a predetermined comparison of said first and second control signals, and position controlling means connected to said signal comparison means and operable with said machine device for controlling the position of said machine device, with said position controlling means being responsive to said actual position signal and said desired position signal for controlling the latter said position in accordance with a predetermined difference between said actual position signal and said desired position signal.

4. In position control apparatus operative with a reference position signal for a machine device, the combination of first oscillatory signal amplifying means, second oscillatory signal amplifying means, a transducer device operable to respond to the position of said machine device, said transducer device having a first variable feedback circuit connected around said first signal amplifying means for providing a self oscillatory first control signal in accordance with the position of said machine device, said transducer device having a second variable feedback circuit connected around said second signal amplifying means for providing a self oscillatory second control signal in accordance with the position of said machine device, signal comparison means operative with each of said first and second control signals for providing a position indicating signal in accordance with a predetermined comparison of said first and second control signals, and position controlling motor means responsive to said reference position signal and being connected to said signal comparison means and operable with said machine device for controlling the position of said machine device in response to each of said position indicating signal and said reference position signal.

5. In position control apparatus for a machine device and being operative with a desired position signal, the combination of first signal amplifying means, second signal amplifying means, a transducer device operable to respond to the position of said machine device, said transducer device having a first position responsive variable coupling circuit connected around said first signal amplifying means for providing a first oscillatory control signal in accordance with the coupling position of said transducer device, said transducer device having a second position responsive variable coupling circuit connected around said second signal amplifying means for providing a second oscillatory control signal in accordance with the coupling position of said transducer device, signal comparison means operative with each of said first and second control signals for providing a position controlling signal in accordance with a predetermined comparison of said first and second control signals, and signal differencing means connected to said signal comparison means and operable with said desired position signal for controlling the movement of said machine device in accordance with the difference between said position controlling signal and said desired position signal.

6. In position control apparatus for controlling the position of a moving machine member, the combination of first signal means, second signal means, a transducer device adapted to respond to the position of said machine member and including first variable signal feedback coupling means operative with said first signal means for providing a first oscillatory control signal which varies due to the variation in the feedback coupling in accordance with the position movement of said machine member and including second variable signal feedback coupling means operative with said second signal means for providing a second oscillatory control signal which varies due to variation in the feedback coupling in accordance with the position movement of said machine member, and position controlling means operable with said machine member and responsive to each of said first and second oscillatory control signals for controlling the position of said machine member.

References Cited in the file of this patent
UNITED STATES PATENTS

| | | |
|---|---|---|
| 2,455,364 | Hays | Dec. 7, 1948 |
| 2,940,026 | Raque | June 7, 1960 |
| 2,947,929 | Bower | Aug. 2, 1960 |